United States Patent
Renninger et al.

(10) Patent No.: US 7,966,877 B2
(45) Date of Patent: *Jun. 28, 2011

(54) HEATED HOT-FILM AIR-MASS SENSOR

(75) Inventors: Erhard Renninger, Markgroeningen (DE); Gerhard Hueftle, Aspach (DE); Joerg Brueckner, Sindelfingen (DE); Bernhard Opitz, Leonberg (DE); Bernd Kuenzl, Schwieberdingen (DE); Uwe Konzelmann, Asperg (DE); Ulrich Wagner, Stuttgart (DE); Henning Marberg, Weil Der Stadt (DE); Christoph Gmelin, Stuttgart (DE); Matthias Illian, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 384 days.

This patent is subject to a terminal disclaimer.

(21) Appl. No.: 11/887,718

(22) PCT Filed: Feb. 23, 2006

(86) PCT No.: PCT/EP2006/060218
§ 371 (c)(1),
(2), (4) Date: Feb. 3, 2009

(87) PCT Pub. No.: WO2006/108734
PCT Pub. Date: Oct. 19, 2006

(65) Prior Publication Data
US 2009/0211355 A1    Aug. 27, 2009

(30) Foreign Application Priority Data

Apr. 11, 2005   (DE) .................. 10 2005 016 449

(51) Int. Cl.
*G01F 1/692* (2006.01)
(52) U.S. Cl. .................................. 73/204.26
(58) Field of Classification Search .................. None
See application file for complete search history.

(56) References Cited

U.S. PATENT DOCUMENTS

| 4,294,114 | A | * | 10/1981 | Lauterbach | ............... 73/204.26 |
| 4,408,490 | A | * | 10/1983 | Takahashi et al. | .............. 73/497 |
| 4,596,138 | A | * | 6/1986 | Ito et al. | ...................... 73/114.34 |
| 4,785,662 | A | * | 11/1988 | Ohta et al. | .................. 73/204.21 |
| 4,833,912 | A | * | 5/1989 | Ohta et al. | .................. 73/114.32 |
| 5,255,642 | A | | 10/1993 | Pischke et al. | |
| 6,318,170 | B1 | * | 11/2001 | Renninger et al. | ......... 73/204.26 |
| 6,516,785 | B1 | * | 2/2003 | Nakada et al. | ................ 123/494 |

(Continued)

FOREIGN PATENT DOCUMENTS

| CN | 1459020 | 11/2003 |
| DE | 196 01 791 | 7/1997 |
| DE | 101 11 840 | 10/2002 |
| DE | 102 32 072 | 2/2004 |
| EP | 1 653 201 | 5/2006 |
| WO | WO 02/073140 | 9/2002 |
| WO | 2004/106863 | 12/2004 |

*Primary Examiner* — Harshad Patel
(74) *Attorney, Agent, or Firm* — Kenyon & Kenyon LLP

(57) ABSTRACT

To determine air mass flows, especially for controlling internal combustion engines, a hot-film air-mass sensor is provided, which may be used especially for sensing air mass flows in the intake tract of an internal combustion engine. The hot-film air-mass sensor has a sensor chip having a sensor frame and a sensor diaphragm having at least one heating element and at least two temperature sensors. Furthermore, the hot-film air-mass sensor has a chip carrier for mounting the sensor chip, as well as at least one additional heating element. The sensor chip is able to be heated up using the at least one additional heating element, which is inserted into the chip carrier. Compared to the usual devices, the hot-film air-mass sensor has a lower susceptibility to contamination, especially by oil films.

9 Claims, 5 Drawing Sheets

U.S. PATENT DOCUMENTS

| | | |
|---|---|---|
| 6,820,479 B2 * | 11/2004 | Roeckel et al. ............. 73/202.5 |
| 6,845,660 B2 * | 1/2005 | Hecht et al. ................ 73/204.17 |
| 2003/0154807 A1 * | 8/2003 | Hecht et al. ................. 73/866.1 |
| 2004/0168513 A1 | 9/2004 | Aoshima et al. |
| 2008/0264166 A1 * | 10/2008 | Wienand et al. .......... 73/204.26 |
| 2009/0205417 A1 * | 8/2009 | Opitz et al. ............... 73/204.26 |

* cited by examiner

HEATED HOT-FILM AIR-MASS SENSOR

FIELD OF THE INVENTION

The present invention relates to a hot-film air-mass sensor, particularly for measuring air-mass flows in the intake tract of an internal combustion engine. The present invention particularly relates to a hot-film air-mass sensor having at least one additional heating element for heating up a sensor chip. The present invention also relates to a method for air-mass sensing in the intake tract of an internal combustion engine using a hot-film air-mass sensor according to the present invention, as well as a method for producing a hot-film air-mass sensor.

BACKGROUND INFORMATION

In many processes, for instance, in the field of industrial processing engineering, chemistry or machine construction, a gas mass, especially an air mass, has to be supplied in a specific manner. Among these are especially combustion processes, which run under regulated conditions. In this context, an important example is the combustion of fuel in internal combustion engines of motor vehicles, especially having subsequent catalytic exhaust gas purification. Various types of sensors are used, in this instance, to measure the air-mass throughput.

One sensor type from the related art is the so-called hot-film air-mass sensor (HFM), which is discussed in one specific embodiment, for instance, in DE 196 01 791 A1. Usually, in such hot-film air-mass sensors, a thin sensor diaphragm is applied on a sensor chip, for instance, a silicon sensor chip. On the sensor diaphragm there is typically situated at least one heating resistor, which is surrounded by two or more temperature measuring resistors. In an air flow, that is conducted over the diaphragm, the temperature distribution changes which, in turn, may be recorded by the temperature measuring resistors. Consequently, an air mass flow may be determined, for example, from the difference in resistance of the temperature measuring resistors. Various other variations of this sensor type are known from the related art.

One difficulty with this type of sensor, for example, from DE 101 11 840 C2 is that contamination of the sensor chip, such as with oil, may frequently occur. The sensor chip is normally used either directly in the intake tract of the internal combustion engine, or in a bypass of the intake tract of the internal combustion engine. Even in the operation of the internal combustion engine, oil may deposit on the sensor chip and especially on the sensor diaphragm, in this instance. This oil deposit may lead to an undesired effect on the measuring signal of the sensor chip, especially since an oil film on the surface of the sensor chip has an effect on the thermal conductivity of the surface, which leads to a corruption of the measuring signals.

This oil contamination appears particularly during, or shortly after the shutting down of the internal combustion engine, for instance, of a Diesel engine. After shutting down the internal combustion engine, an overpressure present in a crankcase typically becomes reduced via a crankcase ventilation into the intake tract of the internal combustion engine. In this context, oil vapor or oil mist is frequently carried along, which is in a position to deposit as an oil film in the intake tract, and thus also on the air-mass flow sensor situated there (or in a corresponding bypass).

German patent document no. DE 101 11 840 C2 therefore proposes a sensor chip which has a frame element, for instance, of silicon, having a diaphragm applied onto it. Various metal traces are situated on the diaphragm, which function as electric heaters and/or measuring resistors, whereby the region of the diaphragm forms a sensor region. Moreover, on the surface of the sensor chip, in addition, at least one additional heater is situated, which may be heated electrically in such a way that, in the region of the additional heater, thermogradient turbulences are formed, which lead to the depositing of contamination in the region of the additional heater, out of the way of the region of the sensor region.

However, this device from the related art has various disadvantages. A substantial disadvantage is that, in DE 101 11 840 C2, the additional heater is situated directly near or even on the sensor diaphragm. In the device described, this is conditioned particularly by the silicon sensor chip having only a small surface, so that a positioning of additional heater and sensor diaphragm at a distance has to be implemented technically. In the case of heavy oil loading, this adjacent positioning of additional heater and sensor diaphragm can, however, lead to oil droplets flowing back onto the sensor diaphragm, and can consequently, in turn, lead to contamination of the sensor diaphragm, and to a change in thermal conductivity connected therewith, and consequently to a signal drift.

Furthermore, one disadvantage of the situation shown in DE 101 11 840 C2 is the so-called Marangoni effect, which is the development of different surface tensions at different temperatures. An oil film has a greater surface tension with respect to air in a cold state than in a hot state. If there is a thermal gradient in a liquid, the Marangoni effect usually leads to a fluid motion from warmer zones to colder zones. Consequently, the device in DE 101 11 840 C2 may even have the disadvantage that oil droplets on the surface of the sensor chip are pushed from the additional heater to the sensor diaphragm, and thus the contamination of the sensor diaphragm is even increased, instead of lowered.

An additional disadvantage of the device from the related art is that the main contamination by oil, as explained above, appears at, or shortly after the shutting down of the internal combustion engine, since, at that time, oil mists diffuse through the intake tract and the bypass all the way to the hot-film air-mass sensor, and contaminate it. The devices known from the related art thus have the disadvantage that, immediately after shutting down the internal combustion engine, the hot-film air-mass sensor is strongly contaminated with oil.

SUMMARY OF THE INVENTION

A hot-film air-mass sensor is therefore provided by the exemplary embodiments and/or the exemplary methods of the present invention which avoids the disadvantages of the hot-film air mass sensors known from the related art. Furthermore, a method is provided for air-mass sensing in the intake tract of an internal combustion engine, which may be carried out particularly using a hot-film air mass sensor according to the present invention. Finally, a method is provided for producing a hot-film air-mass sensor, particularly a hot-film air-mass sensor according to the present invention.

One aspect of the exemplary embodiments and/or the exemplary methods of the present invention is to use a sensor chip and an additional heating element. The sensor chip, which has a sensor frame and a sensor diaphragm having at least one heating element and at least two temperature sensors may, for instance, be designed according to the related art, for example, as described in DE 196 01 791 A1. The sensor chip is inserted into a chip carrier for the mounting and contacting of the sensor chip. In particular, this chip carrier may have a sensor nose, for example, a sensor nose which has a plastic component and which extends directly into an intake tract of an internal combustion engine or into a bypass to an intake tract of an internal combustion engine. This sensor nose may be attached to a sensor housing as a plastic component, for instance, to a sensor housing made of sheet steel. The at least one additional heating element in this context is mounted in the chip carrier, for instance in the sensor nose, in such a way that the sensor is able to be heated up by using an additional heating element. In particular, this heating up is supposed to be able to take place in such a way that the sensor chip is completely and uniformly heated up by the at least one additional heating element.

In one embodiment of the present invention, the chip carrier has a depression, the sensor chip being inserted into this depression so that the sensor chip ends essentially flush with the chip carrier. In this way one is able to avoid gradations on the surface, which in turn could lead to turbulences and to additional deposits of contaminations. The at least one additional heating element may be set into the chip carrier as a separate element, for instance, into the back side of the chip carrier opposite to the chip side. Alternatively or in addition, the at least one additional heating element may also be a direct component of the chip carrier. For instance, at least one resistor track may be applied directly onto the chip carrier, for example, within the above-named depression, to accommodate the sensor chip. As described above, if the chip carrier has a plastic component part, this heating resistor may be implemented using the at least one resistor track, for instance, as an MID component (molded interconnect device, an injection-molded circuit carrier). Various methods known from the field of MID technology may be used in this context, for instance, multi-component injection molding, in which the chip carrier is made up of at least one metallizable and one non-metallizable plastic component. Hot foil stamping methods may also be used, in which the resistor track is pressed onto a plastic surface using a hot foil stamp and a metallic hot foil. Moreover, laser patterning methods may also be used, such as so-called laser direct patterning methods (LDS). The surface areas of the plastic are selectively activated by a laser, in this instance, so that, in a subsequent metallizing step, only these activated surface areas are metallized, for example. The methods named may also be partially combined. Further method features as well as additional MID methods are known to one skilled in the art. First of all, for instance, the sensor carrier may be attached to a sensor housing, for instance, using an appropriate injection molding process.

Thereafter, according to the method described above, the at least one additional heating resistor is metallized onto the sensor carrier, for example, using one of the MID methods that was described. The sensor chip, which may be a sensor chip of the type described, is subsequently applied onto the at least one additional heating resistor. Finally, the at least one circuit substrate is mounted on the sensor housing for the activation of the hot-film air-mass sensor and the additional heating element, at least one electrical contact of the at least one circuit substrate being connected to at least one electrical contact of the at least one additional heating resistor.

An essential advantage of the embodiment according to the present invention of the hot-film air-mass sensor is that the entire sensor chip is able to be heated. Because of this, the transition from heated region to cold region occurs advantageously only at the transition between the sensor chip and the chip carrier. Consequently, because of the Marangoni effect mentioned, oil droplets are totally displaced from the sensor chip and deflected to the surrounding chip carrier. In this context, one may also use heating elements which have specially adjusted temperature profiles, in order to ensure an optimal displacement process and a uniform droplet transport up to the edge of the sensor chip.

Furthermore, because of the heating of the entire sensor chip, the thermal gradient turbulences, that were mentioned, at the transition between a heated surface and a cold surface in the surrounding flow medium are displaced from the surface of the sensor chip all the way to the edge of the sensor chip. Since oil contamination, particularly by oil vapors and oil mists diffusing into a bypass, which may appear in the region of these thermogradient turbulences, the zone of these thermo-gradient turbulences, and thus the zone of maximum pollution is pushed away from the chip surface to the chip carrier, by the embodiment of the hot-film air-mass sensor according to the present invention. Contamination of the surface of the sensor chip is minimized too, thereby. The sensor diaphragm is hardly hit any more by oil droplets and therefore remains clean, and because of this, a sensor drift is largely avoided during operation.

The hot-film air-mass sensor, according to the present invention, may be operated to the extent that at least one additional heating element essentially heats the sensor chip continuously during the operation of the hot-film air-mass sensor. Even the adaptation of the heating to various operating states of the internal combustion engine is conceivable, in particular, for example, in operating states in which an aggravated oil contamination is to be expected, stronger heating of the sensor chip taking place. Alternatively or in supplement, the additional heating by the at least one additional heating element may be continued even after shutting down the internal combustion engine for a specified postheating period. In particular, the postheating period may be dimensioned so that the above-described diffusion of oil vapor or oil mist, which is created by the ventilation of the crankcase, is closed off. A postheating period having a length of 10 seconds to 5 minutes may be used, particularly ca. 1 minute may be used. In particular, the postheating period may be developed so that at least one heating element on the sensor diaphragm of the sensor chip is shut off during this time, whereas the at least one additional heating element is in operation. The at least one additional heating element is advantageously not heated during the operation of the internal combustion engine, is heated only at the shutting down or only after the shutting down of the internal combustion engine, and is then left in the heated state for the postheating period mentioned. A gradation in time or a temperature curve of the at least one additional heating element during the postheating period is also conceivable.

The exemplary embodiments and/or the exemplary methods of the present invention is explained in detail below and on the basis of the drawings.

DETAILED DESCRIPTION

Figure 1:
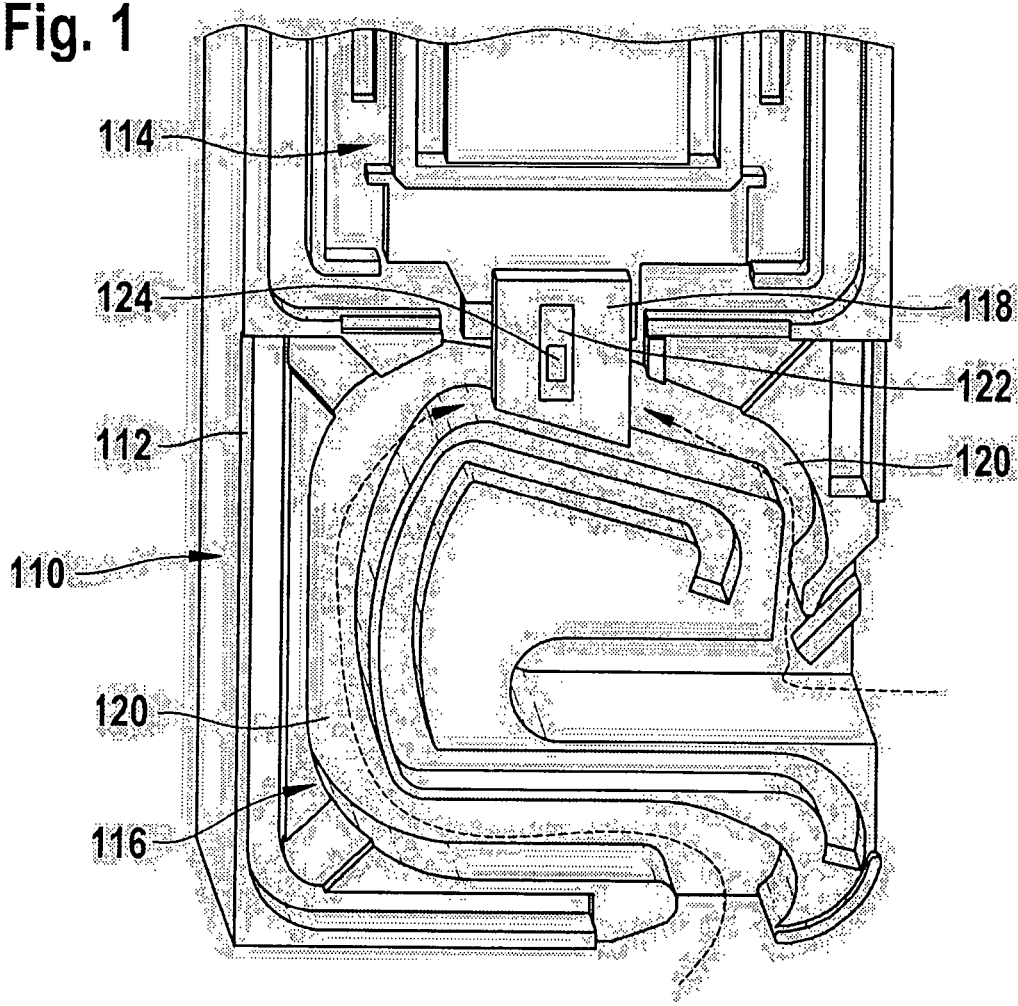
FIG. 1 shows a top view of an hot-film air-mass sensor having a sensor housing, a sensor carrier having a sensor chip and a bypass channel.

A hot-film air-mass sensor 110 is shown in FIG. 1, in a view from above. Hot-film air-mass sensor 110 has a housing 112, which may be developed, for instance, as an injection molded component. Housing 112 has an electronics area 114 and a channel region 116. Electronic area 114 essentially has a recess for accommodating a sensor housing which, however, is not shown in FIG. 1, to keep things simple. Formed onto the sensor housing is a chip carrier 118 developed as sensor nose 118 which extends into a bypass channel 120 that is let into channel region 116 of housing 112. The entire hot-film air-mass sensor 110 is built into an intake tract of an internal combustion engine in such a way that air from the intake tract is able to flow out of the intake tract through bypass channel 120 to chip carrier 118.

Figure 1A:
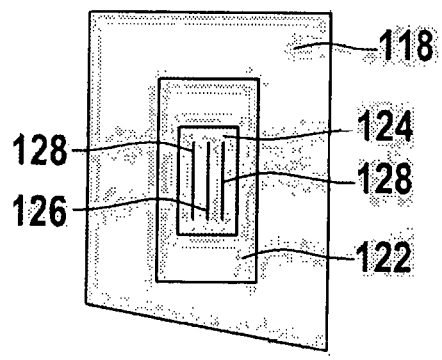
FIG. 1A shows a detailed illustration of a chip carrier used in the exemplary embodiment according to FIG. 1, having a sensor chip inserted.

A sensor chip 122 is let into chip carrier 118, and it has an active area in the form of a diaphragm 124. Sensor chip 122 is developed, for instance, according to the device known from the related art that was described above, and has at least one heating element 126 and at least two temperature sensors 128 on diaphragm 124 (see detailed representation of chip carrier 118 in FIG. 1A). The method of functioning of such hot-film air-mass sensors 110 according to the illustration in FIG. 1 and FIG. 1A is known from the related art.

Figure 2:
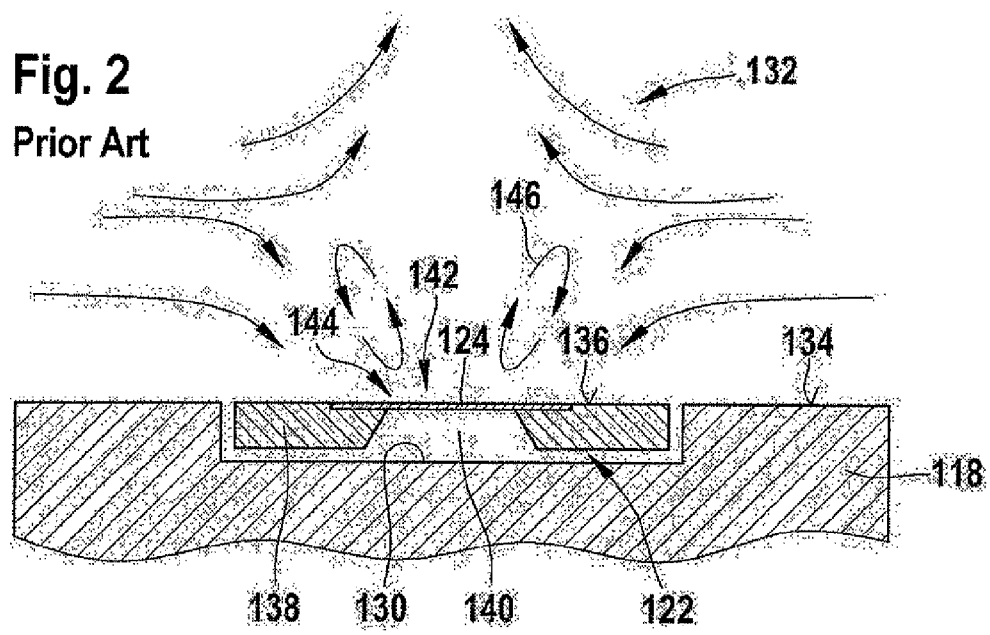
FIG. 2 shows a schematic representation of the course of flow of a flow medium over a conventional sensor chip.
Figure 3:
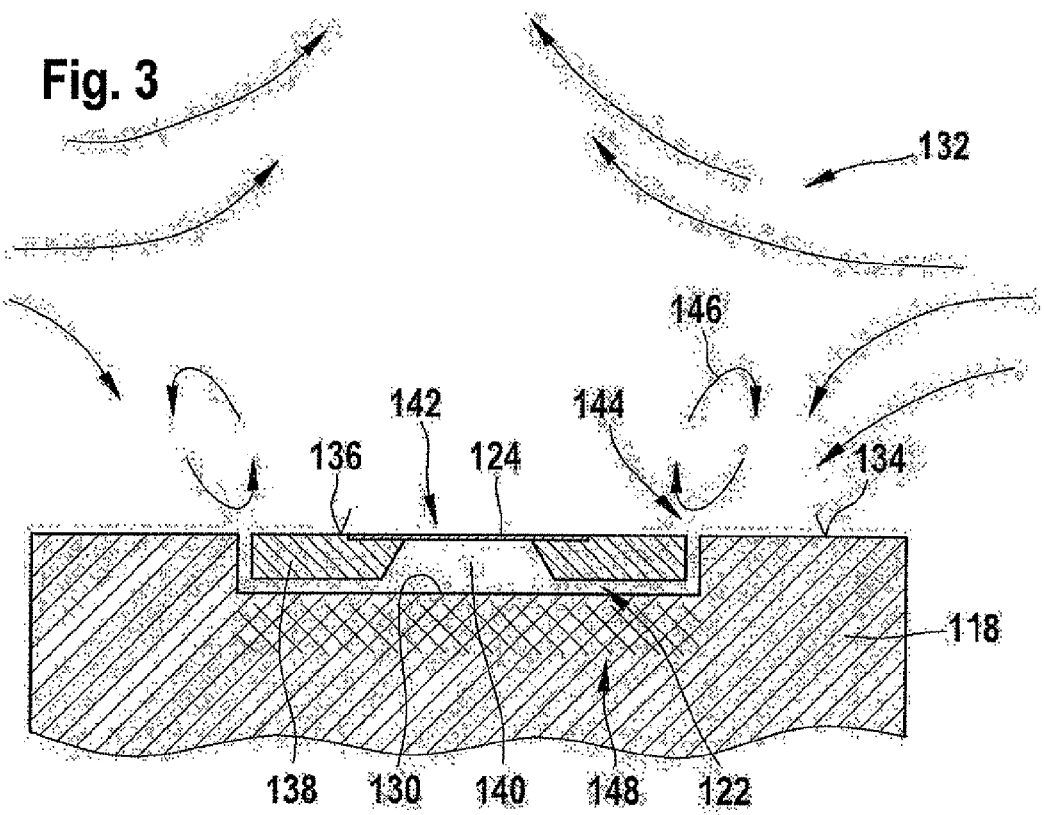
FIG. 3 shows a course of flow of a flow medium over a sensor chip according to the present invention.

As was described above, customary hot-film air-mass sensors 110 having the construction shown in FIG. 1 have, however, problems with contamination. These contamination problems, among other things, are in connection with the development of thermogradient turbulences. FIGS. 2 and 3 should make this clearer. Both figures show a sectional representation through a chip carrier 118. Chip carrier 118 has a depression 130, which is let into a surface 134, of chip carrier 118, that faces a flow medium 132. Sensor chip 122, in this instance, is let into depression 130 in such a way that a sensor surface 136 terminates essentially flush with surface 134. Sensor chip 122 has a sensor frame 138, which may be developed, for instance, as a silicon component. Sensor diaphragm 124 is mounted onto this sensor frame 138.

Sensor frame 138 has an opening 140, in which sensor diaphragm 124 is developed essentially as a self-supporting film. In this region of opening 140, active area 142 of sensor chip 122 is developed on sensor surface 136, within this active area 142 heating element 126 and temperature sensors 128 (not shown in FIGS. 2 and 3) being situated on sensor surface 136.

Hot-film air-mass sensor 110 is usually operated so that heating element 126 is heated to about 200° C. Consequently, in the operation in active area 142 of sensor chip 122, temperatures of this order of magnitude prevail. At the border between active area 142 and sensor frame 138, which usually has a temperature of ca. 20° C. during operation, a large temperature gradient is thus formed. Accordingly, thermogradient turbulences 146 form in flow medium 132 in this transitional region. Within the region of these thermogradient turbulences 146, an oil deposit area 144 consequently forms on sensor surface 136, in which oil droplets or oil mist which may deposit from flow medium 132.

In the exemplary embodiment corresponding to the related art, shown in FIG. 2, sensor chip 122 is not additionally heated. By contrast, an exemplary embodiment according to the present invention is shown in FIG. 3, in which sensor chip 122 is heated over a heating zone 148, that is indicated symbolically in FIG. 3, in chip carrier 118. The development of this heating zone 148 by the integration or insertion of additional heating elements is described in more detail below. According to the exemplary embodiments and/or the exemplary methods of the present invention, in this embodiment according to FIG. 3, heating zone 148 is developed so that it extends essentially up to the edges of depression 130 in chip carrier 118, so that sensor chip 122 may be heated essentially in a homogeneous manner using this heating zone 148. Heating to a temperature of 40 to 180° C., which may be 60 to 100° C. and especially which may be ca. 80° C., has proven itself in experiments. As shown in FIG. 3, this heating of the sensor chip has the effect of heating active region 142 of sensor chip 122 to temperatures of ca. 260° C. to 280° C., whereas sensor frame 138 has a temperature of ca. 80° C. Because of this, thermogradient turbulences 146 are displaced away from active surface 142 towards the edge of sensor chip 122. If, on the other hand, heating element 126 is completely switched off, as happens in one embodiment after shutting down the internal combustion engine, the sensor chip is uniformly heated to ca. 80° C. using heating zone 148. Consequently, oil deposit area 144 also shifts away from active surface 142 to the edge of sensor chip 122 and to the transitional area between sensor chip 122 and chip carrier 118. This heating of sensor chip 122 by heating zone 148 is able to take place during the operation of the internal combustion engine, as was mentioned above, and/or after shutting down the internal combustion engine, and oil vapors, which diffuse through bypass channel 120 to sensor chip 122, condense as oil droplets on active surface 142 of sensor chip 122.

In FIGS. 4, 5A, 5B and 5C different exemplary embodiments are shown which implement the idea, according to the present invention, of heating sensor chip 122 by an additional heating element. FIG. 4 again shows a section through a chip carrier 118 of a hot-film air-mass sensor 110, analogous to the illustration in FIGS. 2 and 3. In the exemplary embodiment according to FIG. 4, a separate, additional heating element 150 is inserted into chip carrier 118. In the exemplary embodiment according to FIG. 4, this additional heating element 150 is designed as a separate component which is embedded in a recess 154 on back side 152. In this exemplary embodiment according to FIG. 4, additional heating element 150 is dimensioned, in its lateral measurements, so that additional heating element 150 does not extend all the way to the edge of depression 130. The dimensioning of additional heating element 150 is such, however, that essentially entire sensor chip 122 is able to be heated homogeneously using additional heating element 150.

Additional heating element 150 may be developed as a commercially available heating resistor, for example. This heating resistor may be supplied with current and it then gives off heat to sensor chip 122. The thermal connection to the sensor chip is able to be made either by radiation (no physical contact with sensor chip 122 being required) or by direct thermal connection (heat conduction), for instance, supported by heat transfer compound between additional heating element 150 and sensor chip 122.

Figure 4:
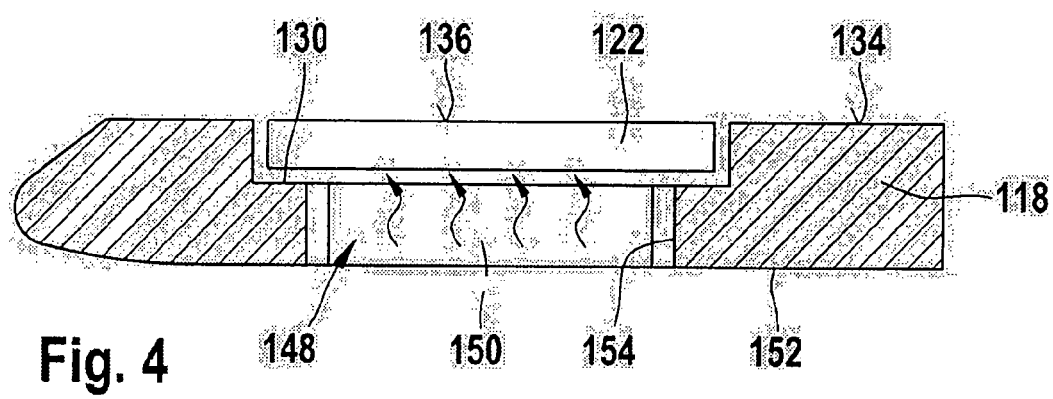
FIG. 4 shows a sectional representation of an exemplary embodiment of a sensor carrier having a sensor chip and a separate heating element set into the sensor carrier from the back side.
Figure 5A:
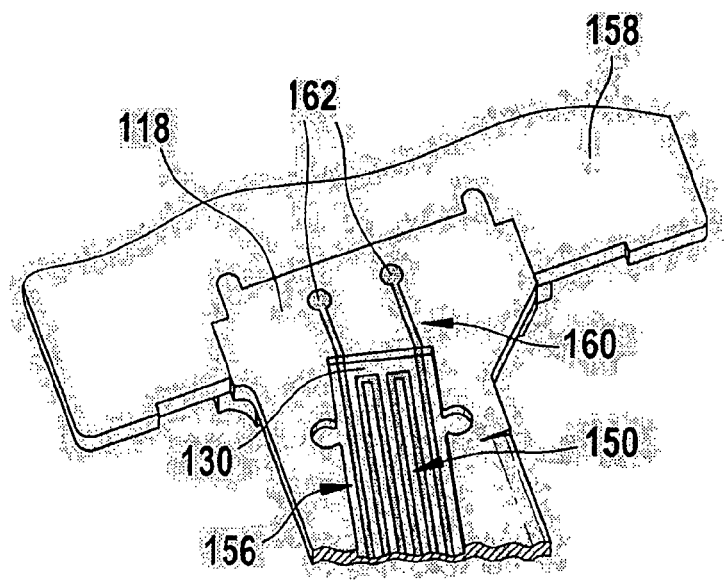
FIG. 5A shows a partial representation in perspective of a hot-film air-mass sensor having a sensor carrier attached as a MID component, in a top view.
Figure 5B:
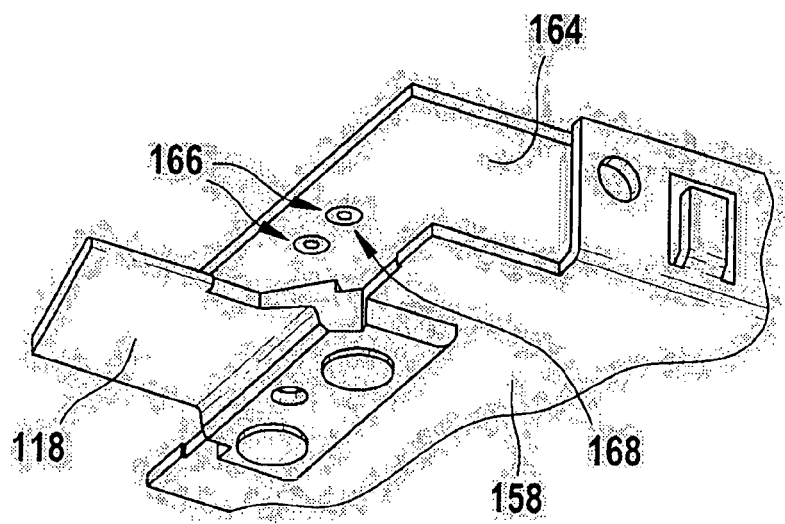
FIG. 5B shows a representation in perspective of the arrangement according to FIG. 5A in a view from below, having a circuit substrate in addition.
Figure 5C:
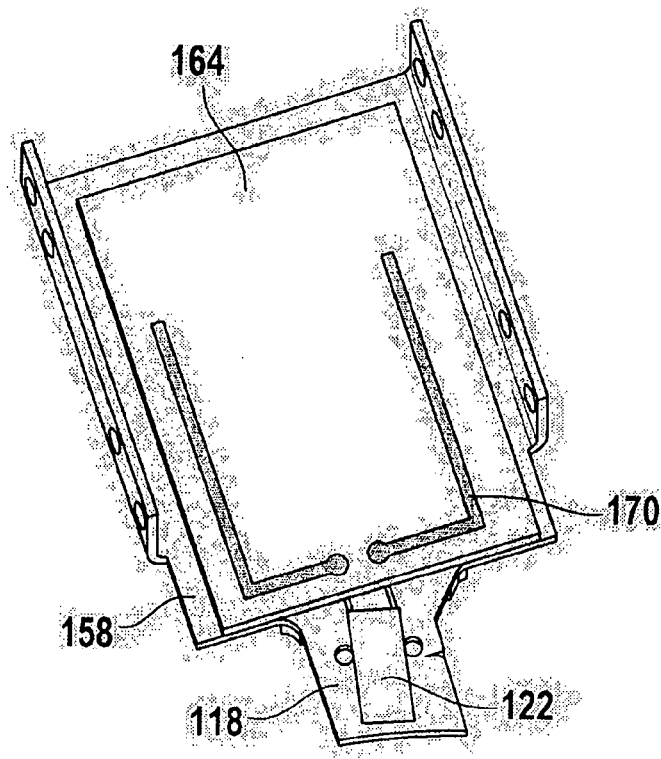
FIG. 5c shows a representation in perspective of the arrangement according to FIGS. 5A and 5B in a top view, having a circuit substrate applied and a sensor chip inserted.

In an exemplary embodiment alternative to the design according to FIG. 4, according to FIGS. 5A to 5C, additional heating element 150 is not developed as a separate component, as in the exemplary embodiment according to FIG. 4, but is an integral component of chip carrier 118.

In this context, additional heating element 150 is developed in the form of heating resistors 156, which are applied to chip carrier 118 as metallic resistor tracks. An MID method may be used in this instance, as described above, for example, laser patterning. Heating resistors 156 may, for example, be developed as copper traces, nickel traces or gold traces on chip carrier 118, as well as traces of a combination of the metals mentioned and/or additional metals, which may be in layer construction. As may be seen in the illustration according to FIG. 5A, these heating resistors 156 are predominantly situated in the region of depression 130 in chip carrier 118. In this exemplary embodiment, this chip carrier 118 is attached to a sensor housing 158, which is formed, for instance, as a bent sheet metal part, by an injection molding process. In this context, supply lines 160 to heating resistors 156 are led out of the region of depression 130, up to contact points 162. In the illustration according to FIG. 5A, sensor chip 122 is not set into depression 130, so as to make heating resistors 156 recognizable in this perspective representation.

In the illustration according to FIG. 5B, which shows a perspective view from below of sensor housing 158 having a formed-on chip carrier 118, it is shown how a circuit substrate 164 is mounted on sensor housing 158. This circuit substrate 164 may be developed, for example, as a ceramic board, and it carries the essential components that are required to control hot-film air-mass sensor 110. Circuit substrate 164 may also be a hybrid circuit or a printed-circuit board. These components are not shown in the illustration according to FIGS. 5B and 5C. Typically, circuit substrate 164 is placed onto sensor housing 158 in a state having its components mounted. On its back side, circuit substrate 164 has two contact points 166, which are connected to two printed-circuit traces 170, situated on the front side of circuit substrate 164, as supply line for heating resistors 156, using two plated-through holes 168.

As is shown in the illustrations according to FIG. 5B and FIG. 5C, circuit substrate 164 is mounted on sensor housing 158 in such a way that contact points 166 of circuit substrate 164 overlap with contact points 162 on chip carrier 168. An electrical contact between these contact points 162 and 166 may be established, for example, by using a conductive adhesive. In this way, supply lines 160 of heating resistors 156 may be supplied with current via supply lines 170 on circuit substrate 164, and thus heat up heating resistors 156. FIG. 5C, which shows a perspective illustration from above, shows how sensor chip 122 is finally set into depression 130 of chip carrier 118. Contacting of the required electrical contacts on sensor chip 122 to corresponding terminals on circuit substrate 164 may be performed by wire bonding. In addition or in supplement, one or more components, especially components for activating heating resistors 156, may be wholly or partially developed as ASIC components (application-specific integrated circuit).

Figure 6:
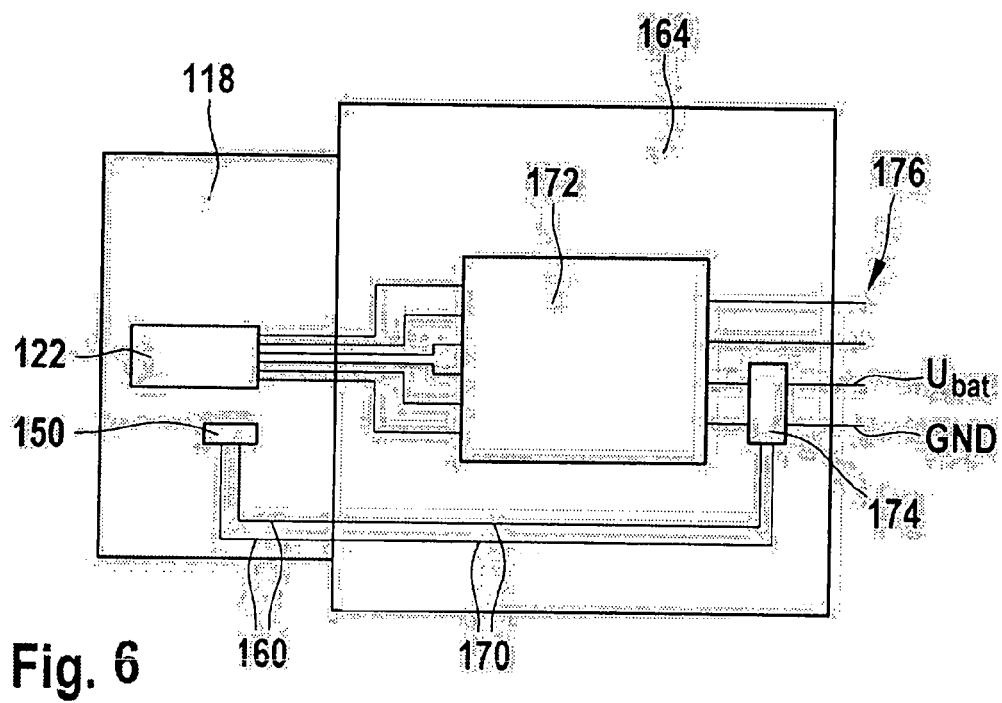
FIG. 6 shows a block diagram of an electronic circuit for heating an additional heating element.
Figure 7:
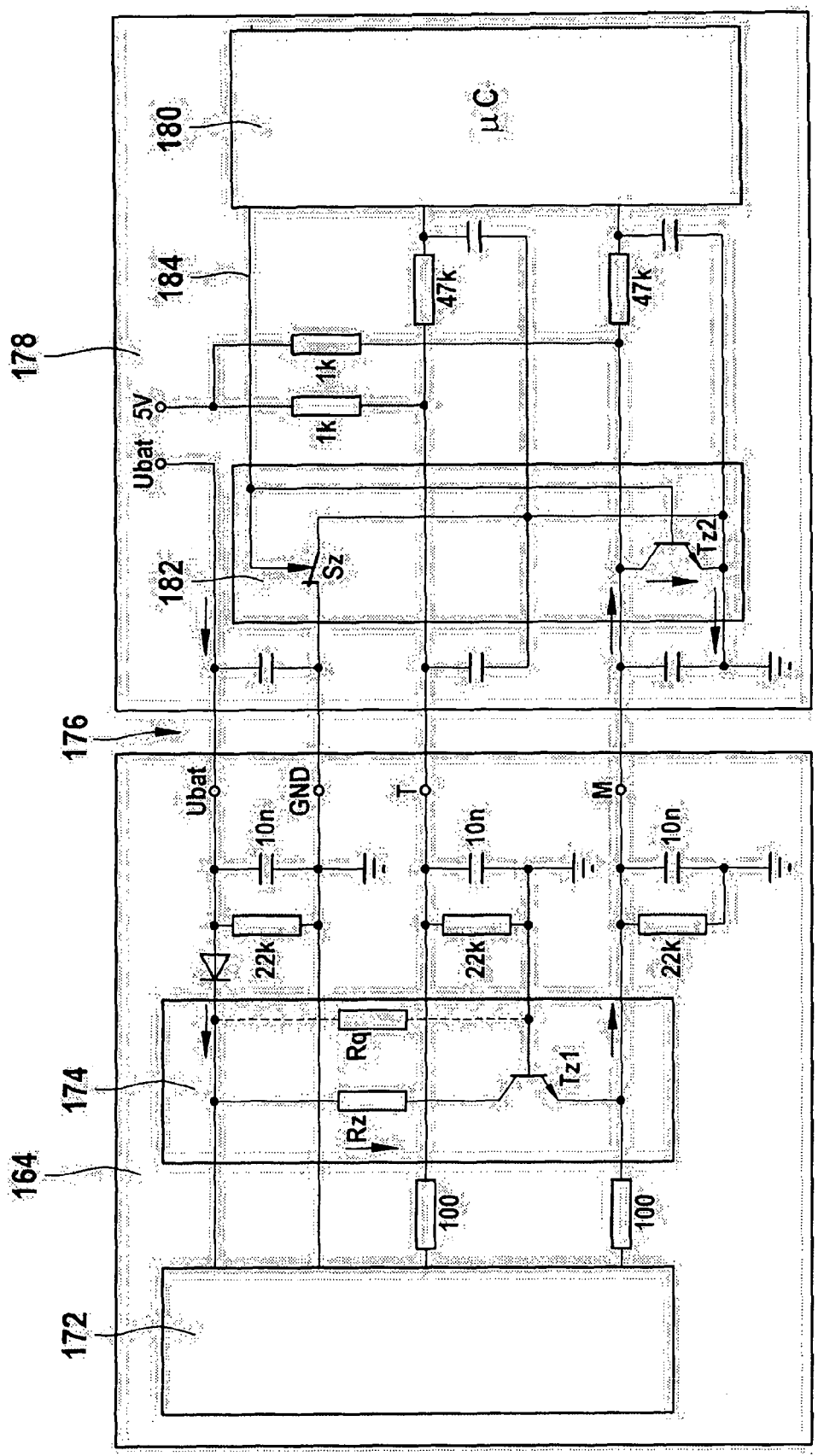
FIG. 7 shows a circuit diagram of an electronic circuit for postheating an additional heating element after shutting down of the internal combustion engine.

Finally, FIGS. 6 and 7 show an exemplary embodiment of an electronic circuit, using which a hot-film air-mass sensor 110 having an additional heating element 150 is able to be controlled, additional heating element 150 being able to be appropriately switched on and off. In this context, as described above, additional heating element 150 may be operated further, even during a postheating period after the shutdown of the internal combustion engine. FIG. 6 shows a simple block diagram which demonstrates how sensor chip 122 is connected to a chip control module 172 that is situated on circuit substrate 164. At the same time, it is shown how additional heating element 150 is able to be controlled or switched, using a switching module 174, which is essentially connected in two supply lines 176 to chip control module 172 (for instance, Ubat and GND).

FIG. 7 shows a more detailed circuit diagram of a specific embodiment of the circuit as in FIG. 6. In addition to modules 172 and 174 shown in FIG. 6, the system as in FIG. 7 shows components of an engine control unit 178 having a microcontroller 180. In this instance, an EDC16 or an EDC17 may be used, for example. Alternatively or in supplementation, the circuit shown in FIG. 7 may be developed wholly or in part as an ASIC.

Chip control module 172 situated on circuit substrate 164 may, for example, be developed analogously to a control circuit for a hot-film air-mass sensor 110 that is described, for example in DE 100 65 038 A1. In addition, in the exemplary embodiment according to FIG. 7, switching module 174 is situated on circuit substrate 164. This switching module 174 essentially has a transistor Tz1 and a heating resistor Rz, this heating resistors Rz symbolizing heating resistors 156 of additional heating element 150, which in reality is not situated on circuit substrate 164. Resistor Rq is an optional component of switching module 174.

In comparison to usual engine control units, switching arrangement 182 is inserted additionally in engine control unit 178. This switching arrangement 182 essentially has a switch Sz that is switchable by microcontroller 180, as well as a second transistor Tz2. For transistors TZ1 and Tz2, one may use, for instance, 200 mA transistors, such as type BC846B, which is extremely inexpensive.

As a result, the circuit shown as in FIG. 7 may be utilized to switch in additional heating element 150 if, at the same time, the remaining functionality of hot-film air-mass sensor 110 is shut off. In normal operation, switch Sz is kept closed via a microcontroller control line 184. Because of this, transistor Tz2 blocks, whereby transistor Tz1 also blocks, so that no heating current is able to flow from terminal Ubat to ground via heating resistor Rz. To switch off hot-film air-mass sensor 110, for instance, when the internal combustion engine is shut down, switch Sz is opened via microcontroller 180. Chip control module 172 is thereby switched off. In response to this opening of switch Sz via microcontroller control line 184, transistor Tz2 is also switched at the same time, so that a current is able to flow via heating resistor Rz, and additional heating element 150 is heated up.

A List of reference symbols is as follows:
110 hot-film air-mass sensor
112 housing
114 electronics area
116 channel region
118 chip carrier
120 bypass channel
122 sensor chip
124 diaphragm
126 heating element
128 temperature sensors
130 depression
132 flow medium
134 surface facing the flow medium
136 sensor surface
138 sensor frame
140 opening
142 active region
144 oil deposit area 146 thermogradient turbulence
148 heating zone
150 additional heating element
152 back side of chip carrier
154 recess
156 heating resistors
158 sensor housing
160 supply lines
162 contact points
164 circuit substrate
166 contact points
168 through-plated contacting
170 supply lines
172 chip control module
174 switching module
176 supply lines
178 engine control unit
180 microcontroller
182 switching arrangement
184 microcontroller control line

What is claimed is:

1. A hot-film air-mass sensor for measuring an air mass flow in an intake tract of an internal combustion engine, comprising:
a sensor chip having a sensor frame and a sensor diaphragm having at least one heating element and at least two temperature sensors;
a chip carrier for mounting the sensor chip; and
at least one additional heating element, which is inserted in the chip carrier;
wherein the sensor chip is uniformly heated using the at least one additional heating element.

2. The hot-film air-mass sensor of claim 1, wherein the chip carrier has a depression, and wherein the sensor chip is inserted into the depression so that the sensor chip ends essentially flush with the chip carrier.

3. The hot-film air-mass sensor of claim 1, wherein the at least one additional heating element has at least one heating resistor mounted on the chip carrier, the at least one heating resistor having at least one resistor track mounted on the chip carrier.

4. The hot-film air-mass sensor of claim 1, wherein the chip carrier is an injection-molded printed-circuit board component (MID component), and is a plastic component that is able to be patterned at least one of by laser, as a multi-component injection-molded component, and as a hot foil stamped component.

5. The hot-film air-mass sensor of claim 1, wherein the chip carrier has at least one front side and one back side, the sensor chip being inserted into the front side of the chip carrier, and at least one of the at least one additional heating element being inserted into the back side of the chip carrier.

6. A method for air mass sensing in an intake tract of an internal combustion engine, the method comprising:
using a hot-film air-mass sensor, which includes:
a sensor chip having a sensor frame and a sensor diaphragm having at least one heating element and at least two temperature sensors,
a chip carrier for mounting the sensor chip, and
at least one additional heating element, which is inserted in the chip carrier; and
heating continuously and uniformly the sensor chip using the at least one additional heating element during operation of the internal combustion engine.

7. The method of claim 6, wherein after shutting down of the internal combustion engine, the at least one additional heating element is further operated for a specified postheating period.

8. The method of claim 7, wherein the postheating period has a duration in time of 10 seconds to 5 minutes.

9. The method of claim 6, wherein at least one additional heating element is heated up simultaneously with or after shutting down the internal combustion engine.

\* \* \* \* \*